United States Patent [19]
Thayer

[11] 3,789,113
[45] Jan. 29, 1974

[54] MODIFIED SYSTEM FOR HEAVY WATER PRODUCTION

[75] Inventor: Victor R. Thayer, Newark, Del.

[73] Assignee: Canadian General Electric Company Limited, Toronto, Ontario, Canada

[22] Filed: Jan. 29, 1971

[21] Appl. No.: 110,993

[30] Foreign Application Priority Data
Feb. 4, 1970 Canada .................................. 73903

[52] U.S. Cl. ............................. 423/580, 423/563
[51] Int. Cl. ....................... C01b 5/02, C01b 17/16
[58] Field of Search ... 23/204 C, 204 R, 181, 210 I; 423/580, 563

[56] References Cited
UNITED STATES PATENTS
3,437,567  4/1969  Bogart .............................. 23/204 R
2,895,803  7/1959  Spevack ............................ 23/181

Primary Examiner—Oscar R. Vertiz
Assistant Examiner—Hoke S. Miller

[57] ABSTRACT

In a heavy water isotopic separation process wherein hydrogen sulphide is separated from waste water and recirculated back to the process by absorption into incoming feed water, the pressures of feed water and the pressure of gas extracted from the waste water are controlled to permit reabsorption of the gas without intermediate recompression.

7 Claims, 1 Drawing Figure

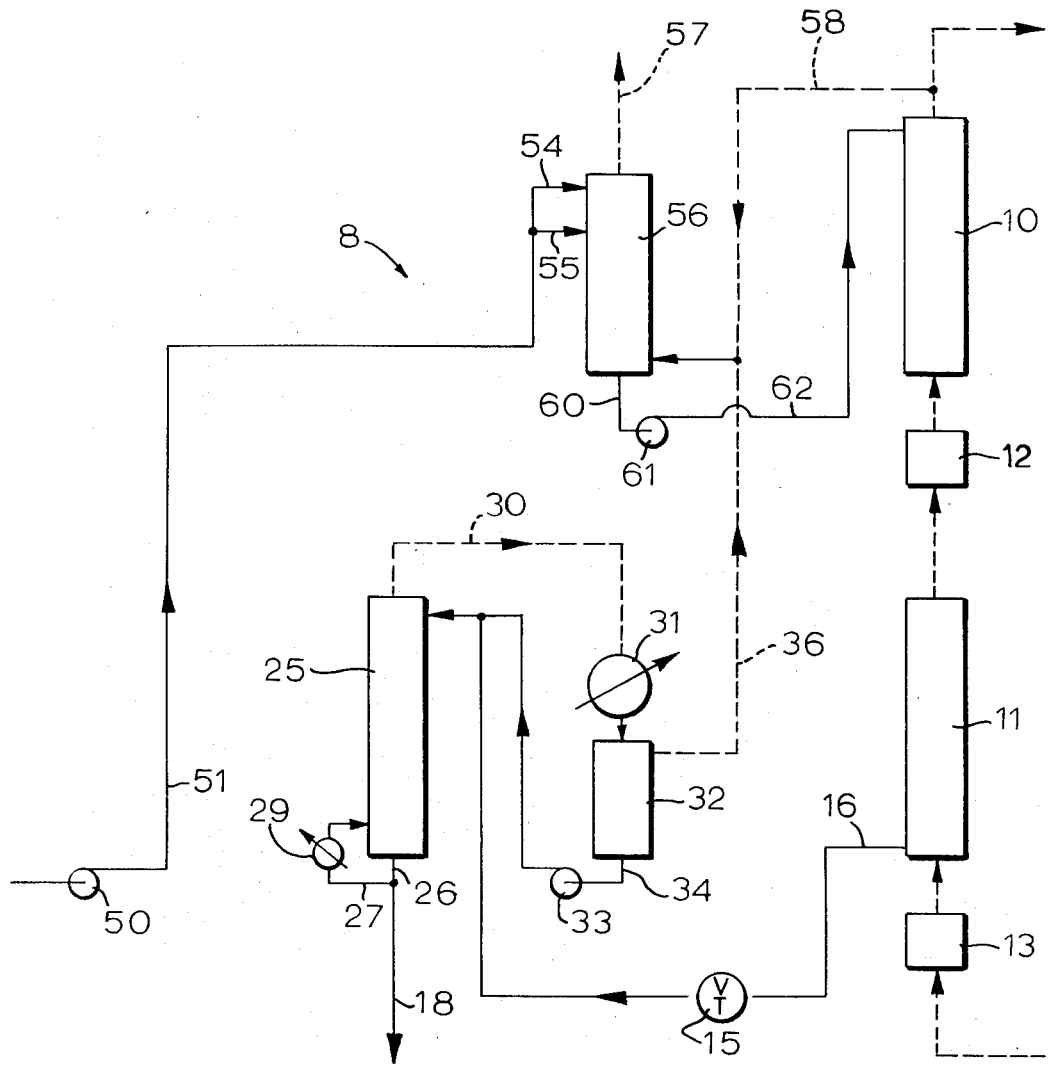

MODIFIED SYSTEM FOR HEAVY WATER PRODUCTION

This invention is directed to an effluent gas stripping process, in particular a method of stripping and reutilizing hydrogen sulphide in a heavy water plant, and to apparatus for carrying out the method.

In an isotope separation process for obtaining deuterium (heavy water) for use in the nuclear industry, wherein hydrogen sulphide is passed in counterflow contact with water containing the isotope, the problem of extracting hydrogen sulphide from the isotope — depleted water is of considerable significance.

Owing to the vast quantities of water passing through such a process, and the economic and conservation imperatives which require the efficient removal of absorbed hydrogen sulphide from the water before discharge of the water from the plant, the provision of an effective gas stripping process is of considerable importance.

In addition to providing effective gas stripping, the effluent gas stripper must also to be of high reliability, as the overall high cost of such a deuterium plant necessitates obtaining optimum plant utilization, with a minimum of down time.

In a previous deuterium plant gas stripper an arrangement was provided in which low pressure steam could be utilized for heating the waste water to evolve a further gas fraction. This use of low pressure steam necessitated operating the stripping cycle at low pressure, close to atmospheric. Reintroduction of the stripped gas into the process, by absorption into the ingoing feed water then required re-compression of the stripped gas to a sufficient pressure to achieve a satisfactory absorption rate in an absorber tower.

A characteristic of such gas reabsorption systems is that increases in water pressure in the absorber tower increases the degree of absorption which may be achieved. In order to practice a gas absorption scheme in a fashion not dependent upon mechanical gas recompressors it is necessary either to maintain the pressure of the gas as evolved from the stripping portion of the process at a sufficiently high value that effective reabsorption is possible, or to carry out the absorption in two or more stages. Operation without mechanical recompression offers important advantages, as follows: (1) a saving in capital cost by eliminating the compressors and (2) a saving in operation cost by eliminating the need for power to operate the compressors. These savings substantially outweigh such added costs for pumps and vessels as may be incurred. A third advantage, which can be even more important than those listed, is the increased reliability of a recovery system that is not dependent upon mechanical compressors. The system can be designed for use with steam at any pressure from about 50 PSIG upwards. At the low end of this range of steam pressures, the absorption will be done using at least two stages whereas with steam at 160 PSIG or higher a single stage suffices.

The present invention thus provides a method of operating a gas - liquid counterflow apparatus in which pressurized gas, being partially soluble in the liquid, is passed upwardly through the pressurized liquid in counterflow relation therewith through a hot exchange zone and a cold exchange zone, pressurized to a first pressure above atmospheric, including the steps of increasing the pressure of feed liquid entering the process to a second pressure value intermediate atmospheric pressure and the first pressure, passing the pressurized feed liquid to an absorber section, extracting from adjacent the bottom of the hot zone at least a portion of hot liquid having gas absorbed therein, flashing the extracted liquid by reducing the pressure thereof from the first value to a third value intermediate the first and second values, separating gas evolved by flashing from the liquid, and passing the separated gas to the absorber section for reabsorption into incoming feed liquid.

The expressing "flashing the liquid" will be understood to mean sudden depressurization of a pressurized liquid to a lower pressure value so that some of the gas absorbed in the liquid is freed from solution in the form of bubbles, which may be separated.

While the following disclosure is particularized in a hydrogen sulphide - water isotope exchange system having a single flashing step, followed by thermal stripping, it will be understood that employment of additional flashing steps lies within the ambit of the invention.

Certain embodiments of the present invention are described, reference being had to the accompanying diagramatic representation which shows a portion of a water-hydrogen sulphide heavy water plant incorporating a gas recovery arrangement according to the present invention.

The illustrated plant portion 8 includes a cold tower 10, dehumidifier 12, hot tower 11 and humidifier 13. In the illustrated arrangement hydrogen sulphide gas circulates upwardly through the serially arranged zones 13, 11, 12 and 10. Incoming feed water containing absorbed recycled hydrogen sulphide recovered by the subject stripping process enters the serially arranged zones 10, 12, 11 and 13 for passage downwardly therethrough.

The cold zone or tower 10 and hot zone 11 may be combined in a single stacked tower, having the dehumidifier 12 located therein.

The subject stripping process operates on hot liquid extracted from adjacent the bottom of hot tower 11, by way of line 16. The pressure of the hot liquid, which contains hydrogen sulphide gas absorbed therein, is suddenly reduced by passage through reducing valve 15, which constitutes flashing. The thus flashed liquid and gas enters near the top of a stripper column 25 for separation of gas upwardly and passage of liquid downwardly. A local recirculation circuit at the bottom of the column 25 in which a portion of stripped liquid taken off at the bottom of the column through line 26 is passed by way of line 27 to a reboiler 29, uses steam or other suitable heating for the reboiler 29 to generate water vapor therein which passes as indicated from the reboiler 29 to a lower portion of the column 25. The water vapor there rises upwardly through the column 25 and strips a further quantity of $H_2S$ gas from the liquid flowing downwardly in the column 25. The stripped gas passes from the top of column 25 by way of line 30 to a cooler-condenser 31 and thence to a separator tank 32, while the effluent liquid having the gas content stripped therefrom passes to drain from column 25 by way of line 18. Substantially dry gas from separator 32 passes to an absorber tower 56 or equivalent into which is admitted incoming feed water, pressurized by pump 50 to a pressure value intermediate atmosphere and the cycle pressure prevailing in the dual temperature zones 10 and 11.

Liquid from the separator 32 passes by way of line 34 and pump 33 to the stripper 25.

The incoming feed water is pressurized by pump 50, and passes by line 51 to the absorber tower 56, where recycled hydrogen sulphide from line 36 is absorbed, while undesired gases such as nitrogen and carbon dioxide are purged from the system at 57. The feed water from absorber 56 is further pressurized by pump 61 to cycle pressure.

A portion of the process gas is extracted from the top of the cold tower 10 by line 58 and taken with the recycled gas from line 36 to the absorber tower 56, primarily to isolate and purge undesired gas such as nitrogen which might otherwise accumulate in the system.

In a typical system having hot and cold towers 11, 10 operating at 300 PSIG, the stripper tower 25 might be operated at 125 PSIG, with the throttle valve 15 serving the purpose of providing the requisite pressure drop.

In an alternative embodiment a flash tank is utilized to provide initial gas separation. Such a tank can operate at an intermediate pressure in the order of 200 PSIG. Gas evolved from this higher pressure flashing is passed to a high pressure stage of the absorber. Thus a dual pressure absorber section operating at an initial pressure between 50 PSIG and 200 PSIG permits efficient utilization of a two stage flashing arrangement.

The efficient operation of such gas recovery arrangements is enhanced by the provision of suitable cooler condensers and separators to optimise the recovery and recycling of the hydrogen sulphide.

In the case of a heavy water plant of the prior art, embodying compressors to handle recycled gas, adoption of the subject invention, on the occurrence of compressor break down may permit the maintenance of plant function at part load, by utilizing stripping pressure in combination with a partially pressurized absorber tower or section.

What I claim as new and desire to secure by Letters Patent of the United States is:

1. In a method of operating an $H_2O$-$H_2S$ counterflow process for the production of heavy water in which pressurized $H_2S$ gas, being partially soluble in water, is passed upwardly through the pressurized water in counterflow deuterium isotope exchange relation therewith through a hot exchange zone and a cold exchange zone, both pressurized to a first pressure in the order of 300 p.s.i. above atmosphere, wherein deuterium isotope tends to associate with gas in the hot zone to form $D_2S$ and to associate with liquid in the cold zone to form $D_2O$ as available deuterium-enriched fluid feeds for passage to a succeeding stage of the process, the portion of $H_2S$ gas absorbed in water being removed from the hot zone along with hot effluent water flowing therefrom to waste, and wherein $H_2S$ gas is recovered from the effluent liquid by first flashing the liquid to a pressure lower than said first pressure to evolve gas therefrom, the improvement comprising the steps of increasing the pressure of feedwater entering the process to a second pressure value intermediate atmospheric and said first pressure but substantially less than said first pressure, passing the pressurized incoming feed liquid to an absorber section, passing the gas separated by said flashing step to said absorber section for re-absorption into said feed liquid at said second pressure, removing feed water having $H_2S$ absorbed therein from the absorber section, raising the pressure of said feed water having gas absorbed therein to a pressure exceeding said first pressure by pumping, and passing said feed water to said cold exchange zone.

2. The method as claimed in claim 1, including the further step of heating a portion of liquid from the flashing step to produce water vapor, and using said water vapor to strip a further quantity of $H_2S$ gas from the hot effluent liquid in a stripping column receiving said hot liquid therein, said further heating step being effected with low pressure, low temperature steam, and passing said further quantity of gas to said absorber section.

3. The method as claimed in claim 1 including a step of prior flashing of said extracted hot liquid from said first pressure to a pressure having a value substantially above the pressure of said first flashing step and passing gas evolved thereby to a portion of said absorber section pressurized to a value greater than said second pressure for re-absorption into said feed water.

4. The method as claimed in claim 2 including the step of passing said evolved gas after flashing to a cooling zone to condense water vapor therefrom prior to said reabsorption step.

5. The method as claimed in claim 1 wherein said absorber section is operated at a pressure in the order of 125 PSIG.

6. The method as claimed in claim 2 wherein said stripping column is heated at the base whereby said water vapor rises upwardly therein in heat transfer relation.

7. The method as claimed in claim 3 wherein said prior flashing step takes place at a pressure in the order of 200 PSIG.

* * * * *